United States Patent [19]

Siy

[11] 4,286,255
[45] Aug. 25, 1981

[54] SIGNATURE VERIFICATION METHOD AND APPARATUS

[75] Inventor: Pepe Siy, Dearborn Heights, Mich.
[73] Assignee: Burroughs Corporation, Detroit, Mich.
[21] Appl. No.: 146,134
[22] Filed: May 2, 1980

Related U.S. Application Data

[63] Continuation-in-part of Ser. No. 14,023, Feb. 22, 1979, abandoned.
[51] Int. Cl.³ .............................................. G06K 9/52
[52] U.S. Cl. .......................................... 340/146.3 SY
[58] Field of Search ............ 340/146.3 SY, 146.3 SG, 340/146.3 H, 146.3 AE, 149 A; 358/93; 364/200

[56] References Cited

U.S. PATENT DOCUMENTS

| | | | |
|---|---|---|---|
| 3,718,908 | 2/1973 | Bloomstein | 340/149 A |
| 4,020,463 | 4/1977 | Himmel | 340/146.3 SY |
| 4,024,500 | 5/1977 | Herbst et al. | 340/146.3 SG |
| 4,028,674 | 6/1977 | Chuang | 340/146.3 SY |
| 4,101,959 | 7/1978 | Domike et al. | 364/200 |

OTHER PUBLICATIONS

Hanaki et al. "An On-Line Character Recognition Aimed at a Substitution for a Billing Machine Keyboard", *Pattern Recognition*, vol. 8, Apr. 1976, pp. 63-71.
Arakawa et al., "On-Line Recognition of Handwritten Characters", *Review of the Electrical Communication Laboratories*, vol. 26, Nos. 11-12, pp. 1521-1536.
Groner et al., "On-Line Computer Classification of Handprinted Chinese Characters", *IEEE Trans. on Electronic Computers*, Dec. 1967, pp. 856-860.

*Primary Examiner*—Leo H. Boudreau
*Attorney, Agent, or Firm*—Delbert P. Warner; Charles E. Quarton; Kevin R. Peterson

[57] ABSTRACT

A method and apparatus for determining whether a newly-signed signature and a previously recorded signature were made by the same person. The method and apparatus include the steps of and apparatus for scanning a document containing the newly-signed signature to provide an electrical signal representative of the reflectivity of the newly-signed signature and the document and generating a signature envelope from the electrical signal with the envelope being formed of selected points on the signature. A plurality of characteristics of the newly-signed signature are then calculated based on the location and magnitude of the selected points forming the signature envelope with respect to a reference line. The calculated characteristics of the newly-signed signature are then compared with corresponding characteristics of a standard signature formed from a group of previously recorded signatures and a signature verification decision is generated based on the degree with which the compared characteristics match.

9 Claims, 16 Drawing Figures

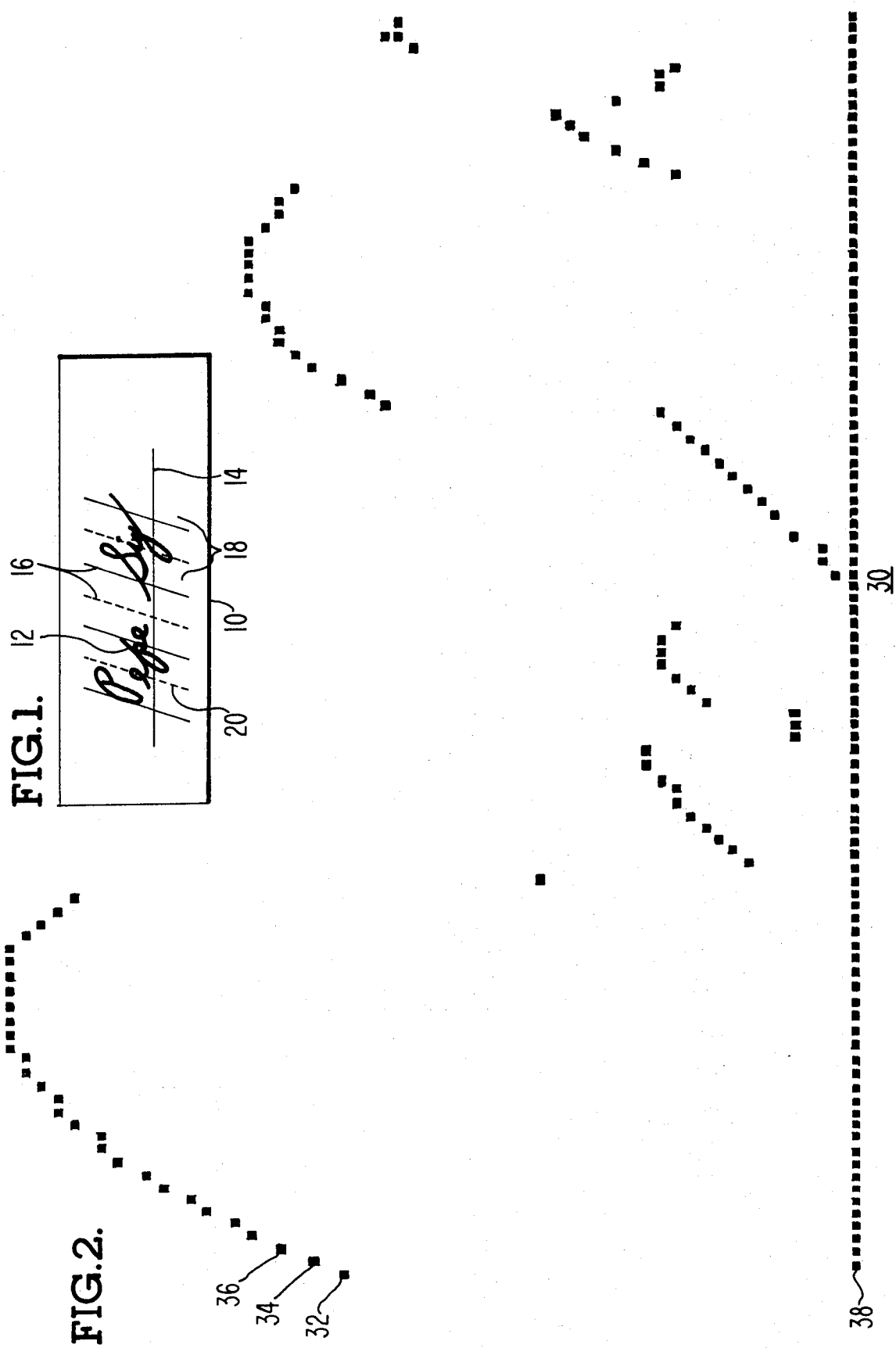

FIG.5.
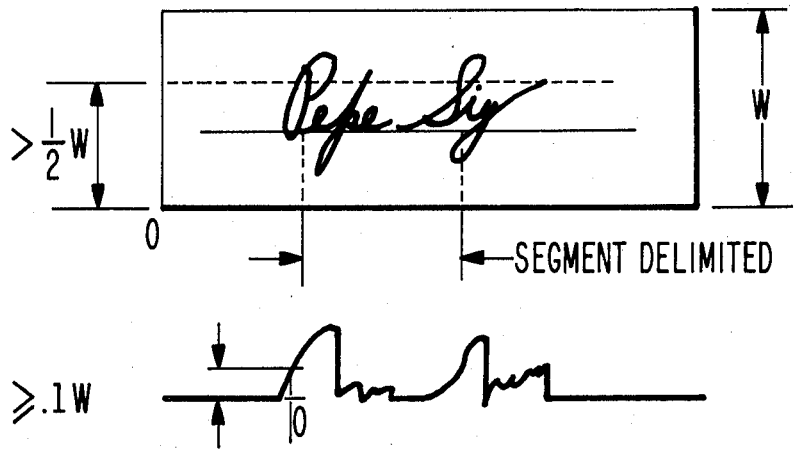
FIG.5A.
ORIGINAL SIGNATURE
FIG.5B.
SIGNATURE ENVELOPE
FIG.6.
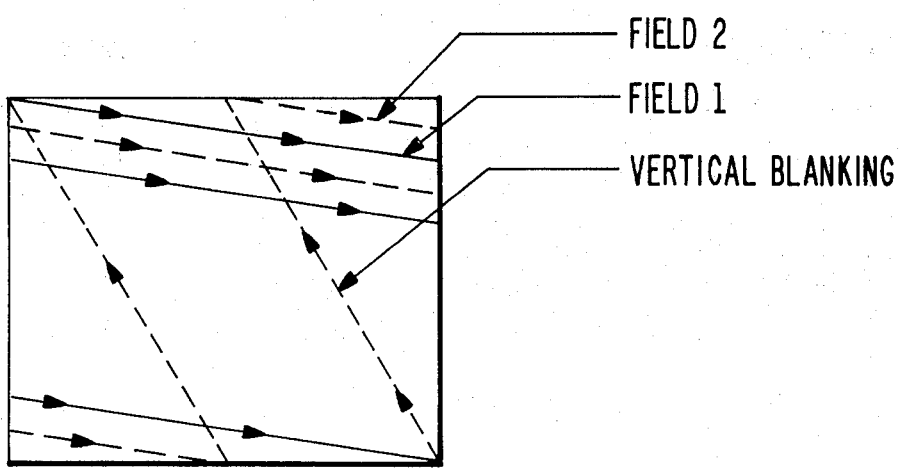

FIG. 7.
FIG. 7A.
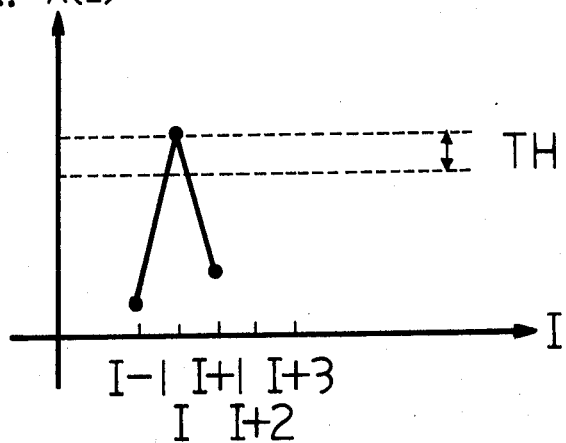
TO ∧ T1 IS TRUE.
FIG. 7B.
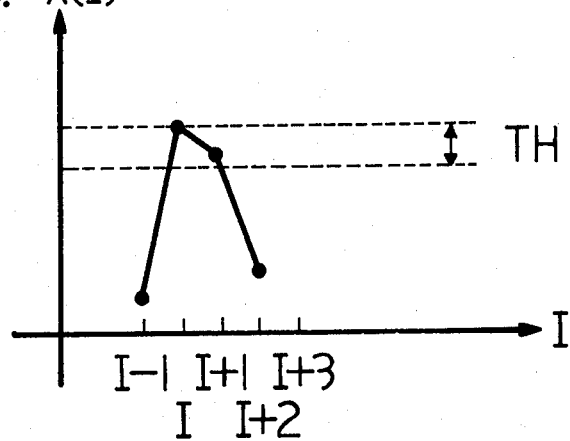
TO ∧ T̄1 ∧ T2 IS TRUE.
FIG. 7C.
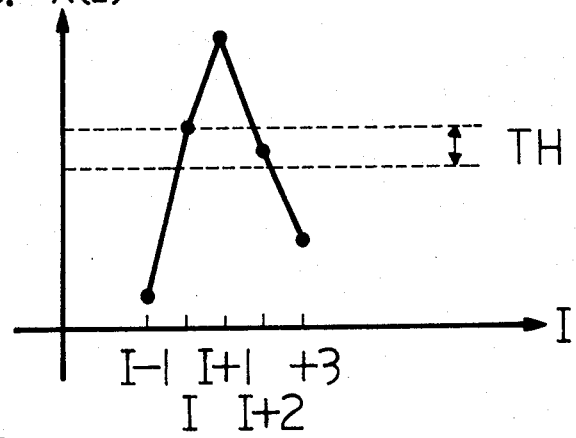
TO ∧ T̄1 ∧ T̄2 ∧ T3 IS TRUE.

FIG. 8
FIG. 8A.
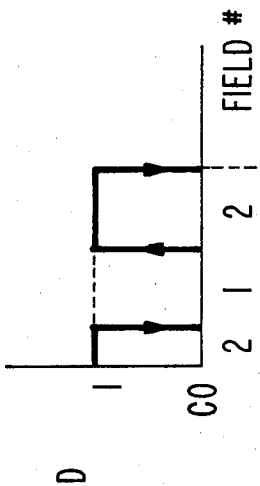
FIG. 8B.
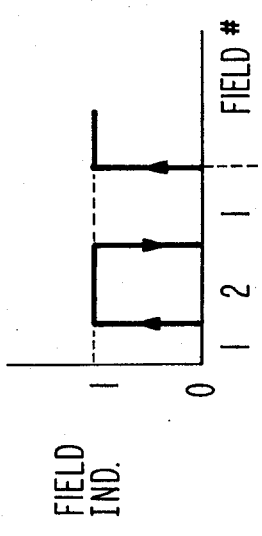
FIG. 8C.
ENVELOPE GENERATING MODE
ENVELOPE TRANSMISSION MODE
FIG. 8D.
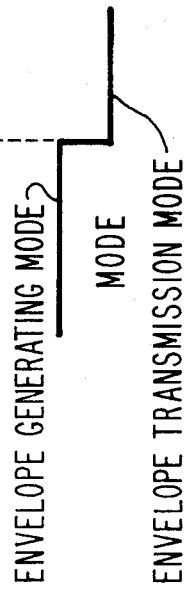

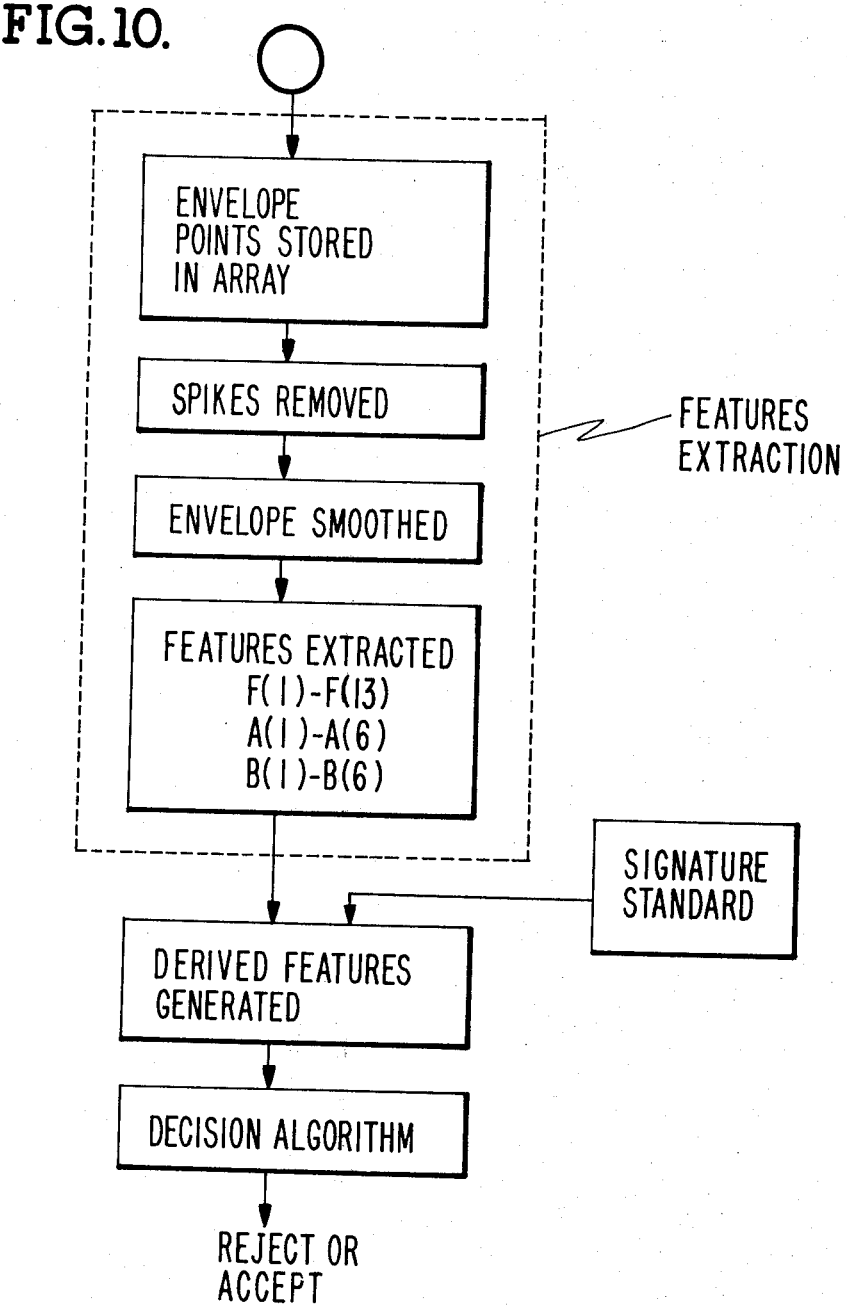

SIGNATURE VERIFICATION METHOD AND APPARATUS

This application is a continuation-in-part of copending U.S. Patent Application Ser. No. 014,023 filed in the name of Pepe Siy on Feb. 22, 1979, assigned to the same assignee and now abandoned.

BACKGROUND OF THE INVENTION

1. Field of the Invention

This invention relates, in general, to personal identification systems and, more specifically, to a method and apparatus for verifying the authenticity of handwritten signatures.

2. Description of the Prior Art

In our present society, merchants in the conduct of their business have a problem of positvely identifying customers, particularly in financial transactions such as those involving checks. One of the oldest forms of identification is the handwritten signature of the individual. The most common method of signature verification is by a visual comparison of a newly-signed signature with a previously recorded signature and an educated guess by the merchant or bank teller whether the two signatures were or were not made by the same person.

The principle difficulty with this signature verification method is the lack of expertise in the merchant or teller to accurately and consistently distinguish an authentic signature from a foregery. Coupled with this problem is the fact that often times the individual is writing under less than ideal conditions compared to the conditions present when the standard signature was made. These problems result in a high rejection rate of valid signatures, thereby causing embarrassment to the holder of the valid signature, or fewer detections of forgeries when examining standards are lowered in order to avoid rejecting a large number of valid signatures.

Many of the present systems for signature verification have recognized that an individual's signature has associated therewith a number of distinct characteristics which can be detected by one means or another and converted into electrical signals which can be automatically processed and compared with a stored representation of an authentic signature for determination as to whether or not the signature currently being investigated is authentic or is a forgery. One such characteristic which has been the focus of considerable attention is the unique pressure which is applied when an individual signs his signature. Although such a technique makes it more difficult for a forger to reproduce an individual's signature, such a technique is in applicable in those commercial environments where the signature is usually applied to a document off-line or not in the presence of the merchant or bank teller.

Thus, it would be desirable to provide a signature verification method and apparatus which provides for verification of a signature without human intervention or visual inspection by another. It would also be desirable to provide a signature verification method and apparatus in which a document may be signed off-line rather than in the presence of another. Finally, it would be desirable to provide a signature vertification method and apparatus in which the representation of the reference signature characteristics is carried on the face of a document to be signed.

SUMMARY OF THE INVENTION

There is disclosed herein a system for determining whether a newly-signed signature and a previously recorded signature were made by the same person. The system includes the steps of and the means for: scanning the newly-signed signature to provide an electrical signal, generating a signature envelope from the electrical signal which is formed of selected points on the newly-signed signature, calculating a plurality of characteristics of the newly-signed signature based on the location and magnitude of the selected points forming the envelope with respect to a reference line, comparing the calculated characteristics of the newly-signed signature with corresponding characteristics of the previously recorded signature and generating a signature vertification decision depending upon the degree with which the compared characteristics match.

The signature vertification method and apparatus of this invention enables the authenticity of a newly-signed signature to be automatically determined without the need for human intervention in the decision making process. This technique increases the rate of forgery detection and reduces the number of valid signatures that are rejected. Further, the document is scanned after the newly-signed signature is applied which enables the signature to be applied off-line, that is, not in the presence of a merchant or bank teller and thereby eliminates a time consuming procedure employed with certain prior art signature verification apparatus based on pressure sensing techniques. Finally, the unique calculated characteristics of the signature used to verify the authenticitiy of the newly-signed signature are condensed to a relatively small number of data bits which thereby enables the standard or reference characteristics to be stored on the face of the document to be signed.

BRIEF DESCRIPTION OF THE DRAWING

The various features, advantages and other uses of this invention will become more apparent by referring to the following detail description and drawing, in which:

FIG. 1 is a pictorial representation of a document bearing an individual's signature;

FIG. 2 is a representation of the signature envelope generated from the signature shown in FIG. 1;

FIGS. 5a and 5b illustrate the thresholding process;

FIG. 6 is a diagram illustrating the two fields of an interlaced picture frame;

FIGS. 7a, 7b and 7c illustrate three types of spikes removed in the operation of embodiments of the invention;

FIGS. 8a, 8b, 8c and 8d illustrate the effect of the location of the scan line at the start of envelope generation request;

FIG. 10 is a flow chart showing how features may be extracted from a signature envelope representing a newly made signature and compared with features from a signature standard to generate a decision respecting validity of the newly made signature.

DESCRIPTION OF THE PREFERRED EMBODIMENT

Figure 3:
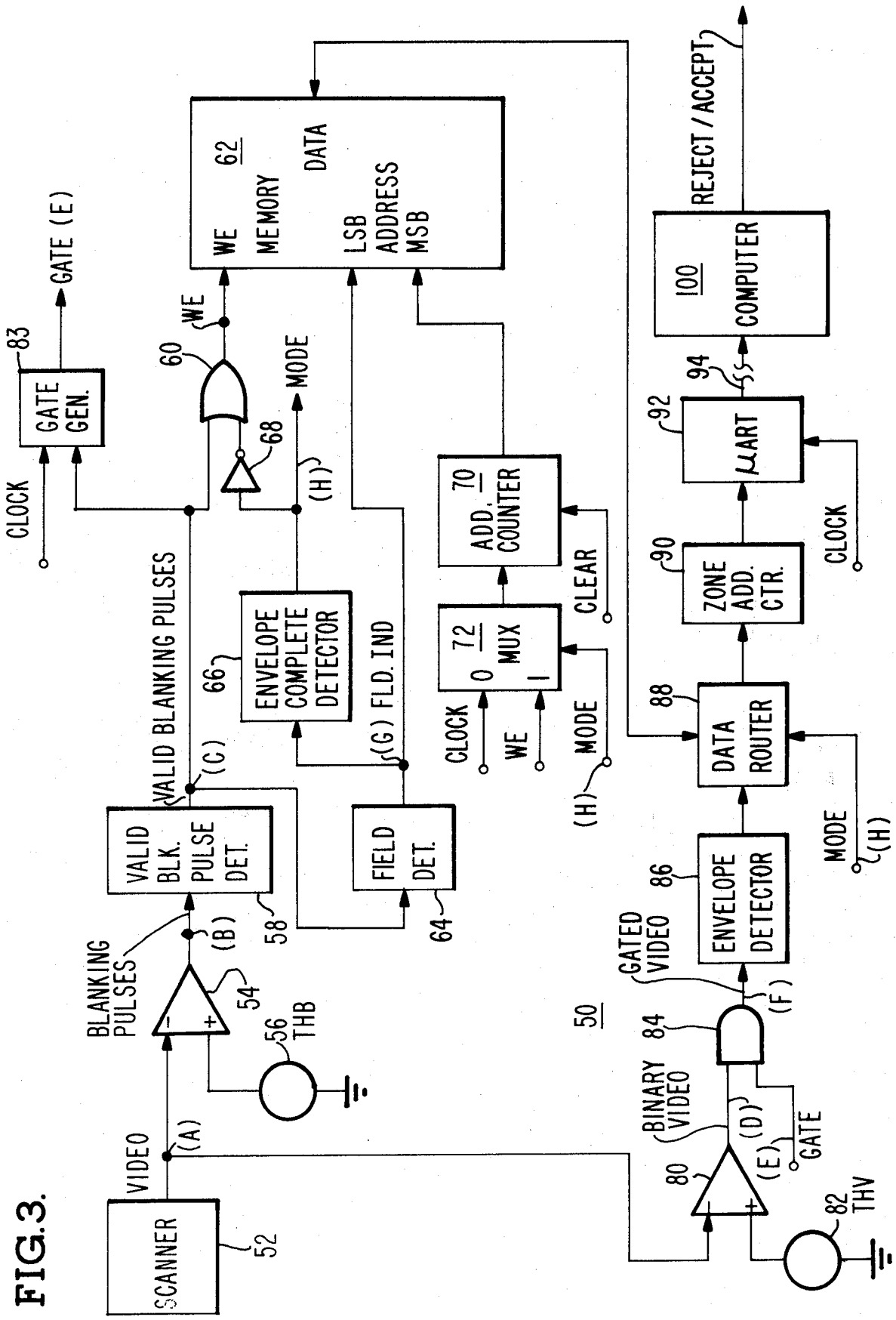
FIG. 3 is a block diagram of signature verification apparatus constructed according to the preferred embodiment of this invention.

Throughout the following description, identical reference numbers are utilized to refer to the same component shown in all figures of the drawing.

FUNDAMENTAL PRINCIPLES

According to the teachings of this invention, an indication of whether an individual signing a signature is in fact the person identified by that signature is automatically produced by comparing characteristic features of the real time signature with corresponding characteristics of a reference signature known to have been signed by a particular person. As is generally known, the top portion of a signature contains most of the stylistic characteristics of that signature, such as extensions, loops, etc. These stylistic characteristics are captured by a so-called "envelope" extraction technique, wherein the envelope is formed by the top portion of a written signature.

In the preparation of a reference signature to be used in checking for authenticity, a person whose signature is to be validated first provides samples (up to a maximum of 25 samples) of his or her signatures to the system. These signatures are scanned and processed to generate the reference or standard features of the signature envelopes. The reference features are stored on a medium that can hold 200 bits of information. Preferably, this medium is the document itself. Upon subsequent presentation of a signature to be verified, the system will scan the new signature image, extract its features from the signature envelope, and compare it with the stored reference features for validation. The optimized algorithm's performance, based on a particular data base, assuming the forger has not seen the signature to be forged, has resulted in a verification acceptance rate of 95.8% and a forgery detection rate of 80%.

Referring now to the drawings, and to FIG. 1 in particular, there is shown a document 10 having an individual's handwritten signature 12 located in a portion thereof. The signature 12 is written on a preprinted line 14 which extends in a first direction along the document 10. The first step in the signature verification technique of this invention is to form a so-called "signature envelope". This is implemented through the scanning of the document 10 by a suitable scanning means, such as a conventional television camera, now shown.

In a conventional television camera, the camera scans each picture frame a plurality of incrementally spaced times, generally in a horizontal direction. For purposes of the present invention, scanning will be done in a vertical direction, as indicated by vertical scans at 18 and 20 in FIG. 1. Accordingly, the document 10 is positioned relative to the camera in such a way that the scanning mechanism will scan the document 10, and more particularly the portion thereof containing the signature 12, in a second direction substantially perpendicular to the first direction of the line 14, or in a vertical direction in the orientation illustrated in FIG. 1. As mentioned previously, the scanning means scans the signature 12 a plurality of periodically occurring, incrementally spaced times or scans 16. According to the preferred embodiment of this invention, an interlace picture frame type scanning means is utilized; although any other type of scanning mechanism, such as a solid state camera, which produces an electrical analog signal representative of the reflectivity of the scanned document may be used as well.

In an interlace type camera, the scanning mechanism is divided into two fields, each including a plurality of incrementally spaced scans. Thus, the scanning means scans the portion of the document 10 containing the signature 12 with a plurality of incrementally-spaced scans, generally indicated by reference numeral 18, in a vertical direction or from the top to the bottom of the signature 12. After completing the first group of field of scans 18, the scanning mechanism returns to the end of the signature 12 and scans the signature 12 a second time with a plurality of scans 20, which are interlaced or alternately spaced between each of the scans 18, which form the first group of scans.

Since most handwritten signatures, such as signature 12, are relatively small, such as those utilized on conventional bank checks, and are approximately $2\frac{1}{2}$ to 3 inches in length, the scanning means is programmed to scan the signature 12 approximately 600 times to cover the entire signature thereby providing approximately 16 mil resolution. Although the above-mentioned resolution of the scanning means is utilized in a preferred embodiment of this invention, other resolutions, such as a resolution of from 8 to 10 mils may also be adequate for positive signature verification.

During each scan, such as scan 18 or 20, the scanning means provides an electrical analog signal indicative of the reflectivity of the document 10, the signature 12 and the reference line 14. This electrical analog signal varies in magnitude with a lower magnitude indicating white or the background portion of the document 10; while a higher output level indicates a black point such as that produced by the signature 12 or the reference line 14.

THE SIGNATURE ENVELOPE

The two dimensional representation of the real signature 12, as captured by the scanning means, is transformed into a one dimensional representation of each of a series of black points by a so-called "envelope" extraction. According to this invention, a signature envelope is bounded on top by a series of selected points from the handwritten signature and on the bottom by a series of points from the reference line. More particularly, a point is said to belong to the envelope of a handwritten signature if, in each vertical scan of the scanning means across the signature, it is the highest point of the signature recorded in each given vertical scan. Thus, in each vertical scan of the scanning means across the signature 12, such as scans 18 and 20, the highest point of the signature 12 is detected and its location with respect to reference line 14 determined and stored as the magnitude of the envelope point for further signature verification processing.

Although the signature envelope is illustrated as being formed of the highest point of the signature detected during each scan across the newly-signed signature, other selection procedures which capture the top portion of the signature may also be used to form the signature envelope.

THRESHOLDING

Each of the first letters in the first name, middle initial and last name is a capital letter. A very high threshold, greater than half the range of the entire envelope ($>\frac{1}{2}$W in FIG. 5a), is utilized to capture a segment of the signature bound by two capital letters that usually would contain a gap or non-signature part. The minimum value in this segment is found and used to translate the signature as follows:

$X(I) = X(I) - \text{MIN} - 3$ : when $X(I) \geq \text{MIN} + 3$
$X(I) = 1$ : otherwise This minimum value for this segment, as detected by the scanning means, is indicative of the horizontal line 14 in the document 10, shown in FIG. 1 and has the effect of setting the horizontal line 14 as the reference base line for the signature envelope. After thresholding, the signature is shifted such that the envelope always starts with the first envelope point that exceeds a given threshold, say 10 percent of the range of the envelope, or 0.10W. FIG. 5b illustrates this process.

SPIKE REMOVAL

Noise in the signature image will perturb the envelope dramatically by creating spikes or pulses of short duration. The method disclosed herein removes the spikes by looking at the points surrounding each recorded envelope point and determining if the difference between a selected point and its neighbors is greater than a predetermined magnitude. If so, a spike has been detected and such a point will be set to the value of the adjacent non-spike envelope point. In the removal of a spike, the following definition is employed with a computer:

LET
$T0 = X(I) - X(I-1) \geq TH$
$T1 = X(I) - X(I+1) \geq TH$
$T2 = X(I) - X(I+2) \geq TH$
$T3 = X(I) - X(I+3) \geq TH$ Where TH=6
If
1. To ∩ T1 is true, then X(I) belong to a spike.
2. To ∩ T1 ∩ T2 is true, then X(I), X(I+1) belong to a spike.
3. To ∩ T1 ∩ T2 ∩ T3 is true, then X(I), X(I+1), X(I+2) belong to a spike.
Where ∩ =AND Reference may be made to FIGS. 7a, b, and c for a showing of the three cases referred to above.

SMOOTHING

The next step in the signature verification method of this invention is to remove the small irregulatiries in the signature envelope, that are caused by sampling resolution, quantization and random noise, in order to enhance the reliability of feature extraction and of the verification procedure. This is achieved by replacing every four consecutive points by the average of the four points for every non-overlapping set of four points, resulting in an envelope of one-fourth the original envelope length. That is:

$$X(K) = \frac{X(L+1) + X(L+2) + X(L+3) + X(L+4)}{4}$$

Where
K=1, 2, ..., N=[M/4]
L=4*(K−1)
M=the original envelope representation length
N=the new envelope representation length
This process has the effect of reducing the horizontal resolution from 4 MILS to 16 MILS.

Referring now to FIG. 2, there is shown a signature envelope 30 that results from the scanning of the signature 12, shown in FIG. 1, and the application of the thresholding and spike removal techniques described above. Viewing the envelope 30 from left to right in FIG. 2, it will be seen that the envelope 30 is formed of a plurality of points, such as points 32, 34 and 36, each having a height above the reference line 38 corresponding to the distance the corresponding point on the hand written signature 12, shown in FIG. 1, is above the reference line 14 on the document 10. Thus, in scanning the signature 12, the scanning means will detect the highest or first portion of the signature 12 encountered in each vertical scan and determine its height above the reference line 14, FIG. 1, in order to form the signature envelope 30 of the signature 12.

EXTRACTED FEATURES

In order to determine whether the hand written signature 12 has written by the same person who signed a pre-recorded signature, a plurality of characteristics or mathemtical quantities are extracted and calculated from a signature envelope such as 30, shown in FIG. 2, and its difference waveform which is formed of a plurality of points whose magnitude corresponds to the difference in magnitude between two adjacent points of the envelope 30. It should be noted that each of the mathematical quantities utilized in the practice of this invention has been determined through experimentation to add significantly to the signature verification process.

The first feature (F1) calculated is the average magnitude (of the position) of each point on the envelope 30, such as points 32, 34 and 36, with respect to the reference line 38. Next, feature (F2), the standard deviation of the magnitude of each point, such as 32, 34 and 36, from the average magnitude calculated above is generated. The third feature (F3) calculated from the envelope 30 is the average magnitude of each point (D) of the difference waveform, as defined above. The fourth feature (F4) is the standard deviation of each point on the difference waveform with respect to the average magnitude of the difference waveform. The next two features (F5 and F6) extracted from the envelope 30 are the average magnitudes of the slopes or differences between two adjacent points on the envelope 30 that cross the average magnitude of the envelope 30 in both positive and negative directions, respectively. According to the orientation of the envelope 30 shown in FIG. 2, a positive slope is defined as a line connecting two adjacent points on the envelope 30 that extends upwards from left to right from the reference line 38.

The seventh feature (F7) extracted from the envelope 30 is the number of points, such as points 32, 34 or 36, that are above the average magnitude of the envelope 30. Next, (F8) the ratio of the area of the points above the average magnitude of the envelope 30 to the average magnitude is calculated. The ninth feature (F9) utilized for signature verification is the number of points in the difference waveform having a magnitude greater than zero. The tenth feature (F10) extracted from the signature envelope 30 is the signature length, wherein the length is determined by the position of the last point in the envelope 30 that exceeds a predetermined threshold value. The eleventh feature (F11) calculated from the envelope 30 is the number of crossings of the average magnitude calculated above having a positive or upwards extending slope. The twelfh feature (F12) calculated is the number of monotonically increasing line segments on the envelope 30 of length greater than a predetermined value, such as a length of three units. Finally, the thirteenth feature (F13) extracted from the signature envelope 30 is the ratio of the length of line segments connecting consecutive envelope points to the horizontal distance between the first and last envelope points.

The extracted features F1–F13 referred to above may be more precisely defined for application in a computer as follows, where the features are extracted from the smoothed signature envelope X(I) and its difference waveform $D(I)=X(I+1)-X(I)$:

1. F(1): The average of $$X = \sum_{I=1}^{N} X(I)/N = AVE$$

2. F(2): The standard deviation of X.

$$= \sqrt{B} \text{ if } B > 1$$
$$= 1 \text{ if } B \leq 1$$
$$\text{where } B = \sum_{I=1}^{N} (X(I))^2/N - (AVE)^2$$

3. F(3): The average of $$D = \sum_{I=1}^{N-1} D(I)/(N-1) = AVED$$

4. F(4): The standard deviation of D.

$$= \sqrt{C} \text{ if } C > 1$$
$$= 1 \text{ if } C \leq 1$$
$$\text{where } C = \sum_{I=1}^{N-1} (D(I))^2$$

5. F(5): The average of slopes at average crossing of X with positive slope.
6. F(6): The average of slopes at average crossing of X with negative slope.
7. F(7): Number of points in X above AVE.
8. F(8): The ratio of area above AVE in X to AVE.
9. F(9): Number of points in D greater than zero.
10. F(10): Signature length, defined as the position of the last point in X that exceeded a given threshold, (THL=6).
11. F(11): Number of AVE crossings with a positive slope in X.
12. F(12): The number of monotonically increasing segments in X of at least length 3, and the difference in height of the first and last point should be at least 4.
13. F(13): The ratio between the length of the lines connecting consecutive envelope points and the horizontal distance between the first and last envelope points.

$$= \frac{\sum_{I=1}^{F(10)} \sqrt{D(I)^2 + 1}}{F(10)}$$

In addition to the above features, the spectral representation of X is obtained consisting of:
A(1), ..., A(6), cosine coefficient terms
B(1), ..., B(6), sine coefficient terms

SPECTRUM EXTRACTION

The envelope representation is of a fixed length, N. This can be used to advantage by pre-computing the sine and cosine terms. The pre-computed tables are:

$$RCOS(I, K) = COS(2\pi(I-1)K/N)$$

$$RSIN(I, K) = SIN(2\pi(I-1)K/N)$$

The subsequent computations of Fourier coefficients are then reduced into simple multiplication and summation operations:

$$A(K) = \frac{2}{N} \sum_{I=1}^{N} X(I) \, RCOS(I, K)$$

$$B(K) = \frac{2}{N} \sum_{I=1}^{N} X(I) \, RSIN(I, K)$$

From the foregoing it will be seen that, in addition to the above described thirteen features that are extracted from the envelope 30, the envelope 30 may be treated as a waveform and Fourier coefficients derived therefrom in order to provide a gross representation thereof. According to the teachings of this invention, six sine and six cosine coefficient terms are calculated for a representation of the envelope waveform.

Although the above listed features extracted from the envelope 30 are utilized in this invention to provide signature verification, they are provided for illustrative purposes only and are not meant to exclude the use of other features or mathematical quantities which can be extracted from the envelope 30 and utilized to improve the reliability of the signature verification decision-making process.

The next step in the signature verification method of this invention is to remove the small irregularities in the signature envelope, that are caused by sampling resolution, quantization and random noise, in order to enhance the reliability of the verification procedure. Accordingly, each four consecutive points on the envelope 30 are replaced by their average magnitude thereby resulting in a so-called smoothed envelope.

SHIFTING IN THE FREQUENCY DOMAIN

The process of encoding the signature characteristics with a minimum number of bits would automatically prevent correlation by shifting the waveforms in the time domain. As an example, if we have 200 samples of the signature envelope at 8 bits each, it would require 1600 bits to represent. This figure would be too large to encode in the magnetic stripe of the credit cards which can hold 1070 bits for two tracks. The technique proposed here enables correlation with shifting yet it only requires a total of 200 bits to represent the signature characteristics. This is achieved by performing correlation with shifting in the frequency domain.

A property of a Fourier transformations is that the effect of shifting in the time domain is equivalent to multiplication by a constant in the frequency domain:

$$X(I-I_o) \rightleftharpoons X(K)e^{-j2\pi K I_o/N}$$

where $e^{-j2\pi K I_o/N} = C(K) + jD(K)$ is a constant for each K.

To speed up the shifting operation, discrete numbers of shifts were specified that range between ±5% of the envelope representation of length N. 5 shift to the left and 5 shift to the right of equal interval. Again pre-computed tables are generated to simplify the computations:

$$RCSHF = COS\ (2\pi K\ 2\ SF\ I/N);\ I = 1, \ldots, 5$$

$$RSSHF = SIN\ (2\pi K\ 2\ SF\ I/N);\ I = 1, \ldots, 5$$

where SF is the shifting factor.

The 10 shifted spectra are generated as follows:

$$\begin{aligned}
AS(K,L) &= A(K)RCSHF(K,I) - B(K)RSSHF(K,I) \\
AS(K,L+1) &= A(K)RCSHF(K,I) + B(K)RSSHF(K,I) \\
BS(K,L) &= A(K)RSSHF(K,I) + B(K)RCSHF(K,I) \\
BS(K,L+1) &= -A(K)RSSHF(K,I) + B(K)RCSHF(K,I)
\end{aligned}$$

The computation with coordinate (K,L) is for left shift and (K,L+1) is the corresponding right shift of equal amount. The desired shifted spectrum is the one that yielded the highest correlation with the standard spectrum. That is:

$$ASHF(K) = AS(K,J)$$

$$BSHF(K) = BS(K,J)$$

where J is selected to yield the maximum:

$$RR(J) = \frac{\sum_{K=1}^{6} AS(K,J)ASTD(K) + BS(K,J)BSTD(K)}{\sqrt{\sum_{K=1}^{6} AS^2(K,J) + BS^2(K,J)}\ \sqrt{\sum_{K=1}^{6} ASTD^2(K) + BSTD^2(K)}}$$

DERIVED FEATURES

The extracted features are signer's dependent. To obtain a generalized decision algorithm that depends only on whether the signature is a verification or a forgery, a signer's independent features are derived from the extracted features (F, A, B) and signer's stored standard features (FSTD, ASTD, BSTD). The following features are derived:

$$FD(I) = |F(I) - FSTD(I)|\ :\ I = 1, \ldots, 13$$

$$FD(14) = RMAX = \frac{\sum_{I=1}^{6} ASHF(I)ASTD(I) + BSHF(I)BSTD(I)}{\sqrt{\sum_{I=1}^{6} ASHF^2(I) + BSHF^2(I)}\ \sqrt{\sum_{I=1}^{6} ASTD^2(I) + BSTD^2(I)}}$$

where ASHF, BSHF are the shifted Fourier coefficient terms that yielded the highest correlation with the standard.

GENERATION OF A STANDARD SIGNATURE

Digressing for a moment from the description of the signature verification technique, a description and the details of the generation of the characteristics of a standard signature that are compared with corresponding characteristics of the real signature, generated above, to provide verification of the real signature will now be described. In the generation of a standard signature, a predetermined number of signatures are collected from an individual. From five to twenty-five signatures are normally required to provide a sufficient basis to generate a standard or reference signature. Accordingly, five sample signatures are utilized in the preferred embodiment of this invention to generate the so-called standard signature. The characteristics corresponding to the thirteen features extracted from the signature envelope 30, shown in FIG. 2 and described above, are calculated for each of the five sample figures and the average of each extracted feature is derived to provide a standard value for each feature or characteristic.

The requirement that the standard be stored on a check prohibits frequent standard updating. The standard can only be updated at the time the checks are printed. It is, therefore, important that a good standard be obtained. The following procedure (1 to 5) assumed that a signature verification algorithm has not yet been established:

1. Collect L signature samples initially from the signer.
2. Form the following:

$$FSTD(I) = \sum_{J} F_J(I)/L \qquad (a)$$

$$R(J) = \sum_{J} \frac{\sum_{K=1}^{6} A_I(K)A_J(K) + B_I(K)B_J(K)}{\sqrt{\sum_{K=1}^{6} A_I^2(K) + B_I^2(K)}\ \sqrt{\sum_{K=1}^{6} A_J^2(K) + B_J^2(K)}} \qquad (b)$$

where $F_J$, $A_J$, $B_J$ are the extracted features of the Jth signature.

3. Let $AS(K) = A_M(K)$, $BS(K) = B_M(K)$; $K = 1, \ldots, 10$, where M: $R(M) = MAX\ \{R(I)|\ I = 1, \ldots, L\}$ 4. FSTD, AS, BS characterize the standard signature if the following condition holds:

$$RS(I) = \frac{\sum_{K=1}^{6} A_I(K)AS(K) + B_I(K)BS(K)}{\sqrt{\sum_{K=1}^{6} A_I^2(K) + B_I^2(K)}\ \sqrt{\sum_{K=1}^{6} AS^2(K) + BS^2(K)}} \geq .75$$

for all I;

Otherwise, (A) the signature that yielded the lowest RS is discarded and replaced by another signature from the signer, or (B) all signatures with RS<0.75 are replaced by other signatures from the signer. The choice of procedure to be used is dependent on the number of signatures available for standard generation. This will be discussed further in the following pages. Steps 2 and 4 are followed until a standard can be obtained. If no standard can be formed after using all the signatures, the signer is willing to provide (maximum of 25) then we invoke the following step only as a last resort, preferably using human intervention to find the reason for failure:

5. The signature set that yielded the maximum R(M) among the signature sets tried is selected to generate the standard.

Since it is difficult to take a straight average with respect to the Fourier coefficient terms, a correlation technique is utilized. According to this correlation technique, the Fourier coefficient terms of the sample signatures are calculated. Taking five sample signatures and using one signature as a base, the coefficient terms of the remaining four signatures are multiplied by ten incremental constants which as the effect of shifting the Fourier coefficients plus or minus five increments in either direction. This is necessary since the Fourier coefficients are dependent upon where on the reference line 14 on the document 10, shown in FIG. 1, the individual first started to sign his signature.

The ten coefficient terms associated with each of the four remaining sample signatures are correlated with the base signature according to equation 2 (b), above, where A and B are the Fourier coefficients of the respective terms, $A_J$ and $B_J$ are the coefficients of the Jth signature, K is the particular coefficient term, and I is the sample number. The shifted term of each of the four sample signatures that gives the highest correlation or magnitude with respect to the base signature is selected, with the highest correlations for each of the four sample signatures totaled with respect to the base signature. This technique is repeated using the other four sample signatures as the base signature and calculating the correlation of the remaining signatures with each respective base signature. After the correlation values for each base signature has been calculated, the signature having the highest total of correlation components is selected with its twelve Fourier terms being used along with the thirteen standard extracted features generated above to describe the standard or reference signature.

Thus, twenty-five characteristics or mathematical quantities are extracted from the signature envelopes of the sample signatures and are utilized to represent the standard signature. Since each of the twenty-five characteristics has a different value range, the range of values for each feature must be normalized so as to store the magnitude of each feature in the smallest number of data bits possible. According to the teachings of this invention, an eight bit data format is utilized to represent each extracted characteristic of a signature envelope. Thus, since there are twenty-five characteristics associated with each signature envelope, two hundred bits of data are needed to represent the characteristics of the standard signature.

Continuing with the description of the signature verification procedure of this invention, the thirteen extracted features and the twelve Fourier coefficient terms calculated above the the newly-signed signature are signer dependent. In order to obtain a generalized decision that depends only on whether the signature is a verification or a forgery, a signer's independent features are derived from the extracted features and the signer's stored standard features. Accordingly, the absolute value of the difference between each extracted feature from the signature envelope 30, shown in FIG. 2, and the standard feature calculated for each of the initial thirteen features is generated. With the Fourier coefficient terms, the coefficients associated with the signature envelope representative of the real signature are multiplied by ten incremental constants which has the effect of shifting the Fourier coefficients plus or minus five increments in either direction. The same correlation technique described above in the generation of the standard signature is utilized to determine which of the shifted Fourier coefficient terms has the highest correlation with the standard coefficient terms, with the highest correlation being utilized as the fourteenth derived feature. Thus, fourteen distinct values or points are calculated to represent the difference between the real signature and the standard signature.

DECISION ALGORITHM

The next step in the verification procedure is to determine if the differences represented by the derived features obtained from the real signature and the standard signature cause the real signature to be labelled a verification or a forgery. According to the teachings of this invention, a discriminant technique is utilized to generate the verification decision to best separate the verification and forgery classes based on the fourteen derived features. In general, the discriminant technique finds the hyperplane to best separate the two distinct classes, either verification or forgery, in this application. The criterion of best is the Fisher ratio which is defined by the ratio of the projected class differences to the sum of the within class scatter along a vector. Although the Fisher ratio, which is well known to those skilled in the art, is utilized to best separate the verification and forgery signatures, other types of discriminant techniques may also be used without departing from the scope or teachings of this invention.

The Discriminant Technique is used to generate the decision algorithm to best separate the verification and forgery classes based on the 14 dimensional derived feature vector. As indicated above, the criteria of best is the Fisher ratio defined by the ratio of the projected class differences to the sum of the within class scatter along a vector d. This is given by:

$$FR(d) = \frac{(d^t U)^2}{d^t A D}$$

where $$Ui = \frac{1}{Ni} \sum_{j=1}^{Ni} Fj \text{ mean of class } i$$

$$\Sigma i = \frac{1}{Ni - 1} \sum_{j=1}^{Ni} (Fj - Ui)(Fj - Ui)^t \text{ coveriance of class } i$$

U = U1 − U2
A = Σ1 + Σ2
d is the vector along which the data is projected.
The vector d that maximizes F(d) is called the Fisher discriminant vector. This vector is given by:

$$d = \alpha A^{-1} U$$

where the scalar $\alpha$ is selected such that $d^t d = 1$. The decision algorithm is:

$$d^t F \leq 1h \text{ verification}$$
$$> 1h \text{ forgery}$$

STANDARD REPRESENTATION OF SIGNATURE FEATURES

The features selected are not normalized, that is, the range of the value of each feature could be different. It was desired that each feature be represented by 8 bits, $2^8 = 256$ distinguishable levels or values. To achieve the highest accuracy within this representation, one should represent each feature using its predetermined range. For example, if the range of the feature is 0 to M, then one represents:

0 by [0000 0000] = 0

M by [1111 1111] = 255 and any value x between 0 and M is represented by the byte representation of y.

$$y = \left[ \frac{X}{M/255} \right]$$

where [a] means the integer part of a. The data base was used to estimate the range of each feature, assuming that each envelope point can have a maximum value of 255. The resulting range of each feature is shown in Table 1. There are 25 features, with 8 bits each yielding a total of 200 bits needed to represent the signature feature standard characteristics.

TABLE 1

| FEATURE | RANGE |
|---|---|
| 1 | 0 to 100 |
| 2 | 0 to 50 |
| 3 | 0 to 1 |
| 4 | 0 to 50 |
| 5 | 0 to 50 |
| 6 | 0 to 75 |
| 7 | 0 to 150 |
| 8 | 0 to 200 |
| 9 | 0 to 200 |
| 10 | 0 to 200 |
| 11 | 0 to 50 |
| 12 | 0 to 50 |
| 13 | 0 to 10 |
| $|A(I)|, I = 1, \ldots, 6$ | 0 to 20 |
| $|B(I)|, I = 1, \ldots, 6$ | 0 to 20 |

FUNCTIONAL DESCRIPTION

Turning now to FIG. 3, there is shown a signature verification apparatus 50 which may be used in the implementation of the verification procedure described above. As shown therein, a scanner, such as a television camera, or an OCR type apparatus generally indicated by reference number 52, is provided for scanning a document, such as the document 10, shown in FIG. 1, in a vertical direction across the document 10 with a plurality of incrementally spaced scans.

As described previously, and indicated in FIG. 5, an interlaced scan is utilized in a preferred embodiment of this invention in which two alternating fields of scans (Field 1 and Field 2) are provided per picture frame. Besides providing a video output signal indicative of the reflectivity of the document 10 during each scan across the document 10, the scanner 52 provides horizontal blanking pulses at each end of a vertical scan and a vertical blanking pulse between the fields of scans as indicated at HB and VB, respectively, in FIG. 4. It will be noted further from FIG. 4 that the vertical blanking pulse is employed when the scanning mechanism returns from the last scan of the first field to the first scan of the second field.

The video output (A) of the scanner 52 is supplied as input to a blanking detection circuit as shown in FIG. 3. The blanking detection circuit includes a comparator 54 which has connected to its inverting (−) input the raw video output (A) from the scanner 52 and to its non-inverting (+) input a reference voltage labelled THB from a suitable voltage source 56. As shown in the raw video waveform (A) in FIG. 4, the comparator 54 threshold THB is set to a predetermined value that will pass the high level blanking pulses from the scanner 52 and suppress the video output information. The output (B) of the comparator 54 is supplied as input to a valid blanking pulse detection circuit 58 which distinguishes between a true blanking pulse of greater than six microseconds duration and a spurious high amplitude video of shorter duration that exceeds the threshold value THB. The valid blanking pulse detection circuit 58 preferably embodies a conventional integrated circuit such as a type 9316 which includes a timer circuit to measure the width of the blanking pulse and provide a valid blanking pulse indication only when the blanking pulse width is greater than six microseconds, as shown in the waveforms depicted in FIG. 4. The output (C) of the valid blanking pulse detection circuit 58 is supplied as an input to an OR gate 60, the output of which controls the write enable (WE) input of a storage means 62. The storage means 62 preferably will be a conventional RAM having a 1024 by 8 bit capacity.

The output from the valid pulse detector 58 is supplied as an input to a field detector circuit 64. The two fields (FIG. 6) of an interlaced picture frame scanner may be distinguished from each other by use of measurements of the scan time between the last horizontal blanking pulse HB and the next vertical blanking pulse VB which will be either a half scan (as shown at ½ H) or a full scan (H, FIG. 4). Thus, the two fields can be distinguished from each other by measuring the time duration of the last valid blanking pulse; if it is greater than a predetermined time increment (about 54 microseconds in a preferred example) then it is a full scan. Otherwise, (at 26+ microseconds) it is a half scan. The field detector 64 preferably employs a type 9316 integrated circuit which includes a timer and a flip flop circuit which measures the difference between two valid blanking pulses and provides an output labelled FLD IND in FIG. 3 for Field Indicator, wherein a ZERO output indicates field number 2 and ONE output indicates field number 1 during each picture frame.

The output of the field detector 64 is provided as input to an envelope complete detector 66 which preferably employs a 74107 comprising dual "JK" negative-edge-triggered flip-flops.

At the time of a signature envelope generation request, all counters and registers are cleared by conventional clearing signals through conventional circuits which are not illustrated. Since, there is no definite way of controlling the scanner 52 to assure it is operating at a particular scan line when data information is to be written into the memory 62, invalid data could be stored in the memory 62. FIG. 8b illustrates the situation when the scan line is at the middle of Field 2 while the RAM should start writing the first envelope at location zero. In use for a different purpose than the present, by allowing sufficient time, the proper envelope data would eventually overwrite the erroneously written data and thereby provide a proper indication of the envelope point values. For this invention, the proper memory address is generated only when the start of a field is known, as indicated by the transition of the FLD IND signal between ONE and ZERO to change from one field to the other. From FIGS. 8a, 8b, 8c and 8d it will be seen that three transitions, such as from logic zero to logic one and back to logic zero, of the FLD IND signal are required to completely write the two fields of data of the signature envelope into the memory 62. The output of the envelope complete detector 66 is a signal (H) labelled MODE, wherein a ONE output level indicates an envelope is being generated and a ZERO output indicates an envelope is complete and the start of envelope transmission. Envelope generating modes and envelope transmission modes are indicated in FIGS. 8c and 8d for the field indicator signals of FIG. 8a and FIG. 8b, respectively. The MODE signal is provided as an input through invertor 68 to the OR gate 60 along with the valid blanking output pulse of the valid blanking pulse detector circuitry 58 so as to enable the write enable input of the memory 62 and allow data input to the memory 62 at the proper time.

The blanking detection circuit further includes an address counter 70 which preferably employs a 9316 and which supplies the upper eight most significant bits (MSB) of the memory 62 address. The least significant bit (LSB) of the memory 62 address is provided by the FLD IND signal from the field detector 64. Thus, data generated during field one scans of the scanner 52 is written into the even address locations; while field two data is written into the odd address locations. During the envelope generation mode, when the MODE signal equals one, the address counter 70 is reset by each FLD IND transition and incremented after each memory write signal as selected through multiplexer 72 under the control of the MODE signal. The multiplexer 72 will include a pair of AND gates coupled responsive to WE and alternately to CLOCK pulses and MODE pulses to apply suitable signals to the ADDRESS counter 70. In the envelope transmission mode, when the Mode signal equals zero, the address counter 70 is reset once and incremented with a 100 Hz clock signal through the multiplexer 72.

Figure 4:
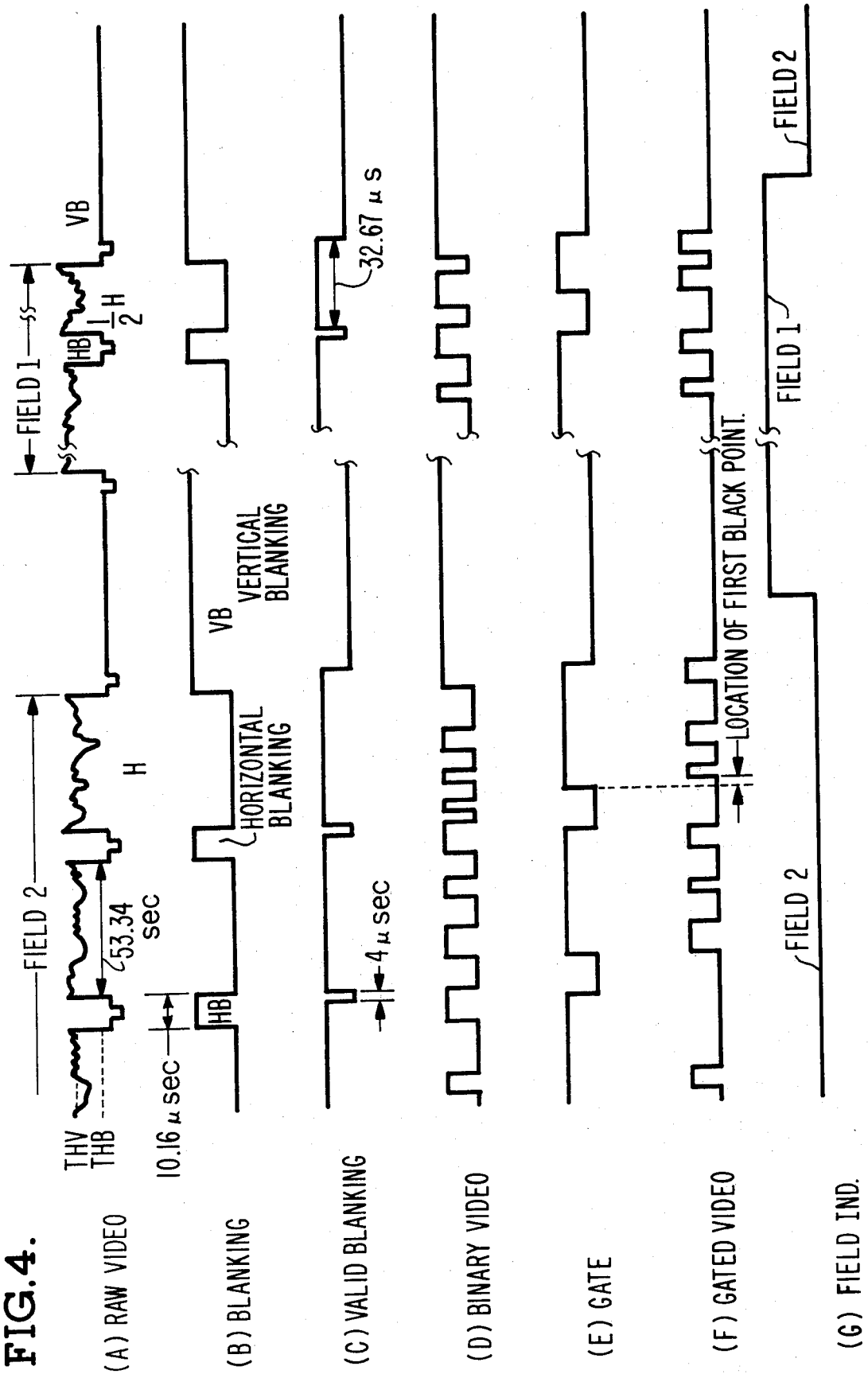
FIG. 4 is a timing diagram showing several waveforms that depict the operation of the signature verification apparatus shown in FIG. 3.

The signature verification apparatus 50 further includes an envelope generator circuit which receives video input from the scanner 52. The video output of the scanner 52 is provided as input to the inverting (−) input of a comparator 80, while the non-inverting (+) input is connected to a suitable voltage source 82 to provide a threshold voltage labelled THV. The output (D) of the comparator 80, labelled BINARY VIDEO, is generated by adjusting the video comparator 80 threshold input THV until the desired weakest signature signal appears as binary video without allowing noise background to appear. By comparing (D) with (B) in FIG. 4, it will be seen that the binary video (D) includes blanking pulses. The output of the comparator 80 is input to an AND gate 84 along with a signal (E), labelled GATE, from an integrated circuit 83, which is generated a predetermined time after a blanking pulse is provided by the scanner 52. In a preferred embodiment of the gate signal (E) is generated by use of a 9316 which is triggered by valid blanking pulses (C) to go low and to stay low for a given number of clock pulses, as indicated in FIG. 4. In this manner, the situation in which the blanking pulse itself is considered as a location of the first black point in a scan is prevented since the BINARY VIDEO signal is gated to provide GATED VIDEO so it does not start sending data to the envelope detector circuit 86 until a given time delay has elapsed.

The GATED VIDEO signal (F) from the AND gate 84 is input to an envelope detector circuit 86. The envelope detector 86 is essentially a counter, which in a preferred example is a BCD Decade/Four Bit Binary Counter of type 9316, which starts counting at the start of the GATED VIDEO signal and stops counting either at the first black point encountered during each scan or when it reaches a maximum count of 255. In this matter, the counter in the envelope detector 86, when stopped, contains a value that is representative of the location of the first black point with respect to the reference line encountered during each vertical scan over the real signature. This counter output is sent through a data router 88 (formed by a tri-state device 8737 manufactured by Signetics) to the memory 62 under the control of the MODE signal (H). When the MODE signal is at a one logic level during the envelope generating mode, the counter output (from 86) is an input to the memory 62. When the MODE signal is at a zero logic level during the envelope transmission mode, the data line of the memory 62 is treated as an output through the data router 88 to a computer 100.

The calculation of the predetermined characteristics of the signature envelope, a comparison of the calculated features with corresponding features of the stored standard and the generation of a reject or accept decision indicative of the indentification of a signature as authentic or a forgery is carried out by a suitable data processing apparatus, such as a computer 100. The computer 100 may be any general purpose digital computer which has stored therein program instructions for processing the data received from the memory 62. Given the detailed description above, a digital computer 100 may be easily programmed by one skilled in the art to provide the above functions, and further details regarding the stored program necessary to implement the signature verification technique of this invention will not be described in detail herein.

In the event that the digital computer 100 is not at the same geographical location as the signature verification apparatus 50, data communication means are necessary to couple the output of the signature verification apparatus 52 to the digital computer. The data communication means includes a zone address counter 90 which formats the data such that each eight bit data output from the memory 62 is packed into two bytes, each byte containing four bits designating zone address and four bits indicating data. The zone bits for the two bytes are chosen to be different in order to distinguish between the upper and lower four bits of each data byte. The output data from the zone address counter 90 is input to a universal asynchronous receiver transmitter 92 which converts the parallel data into serial form for transmission on a data communication channel 94 to the digital computer 100. This invention has been implemented by use of a Burroughs 4800, but the computer 100 is preferably a microcomputer employing a microprocessor such as an 8080 or 280 rather than a larger computer.

Figure 9:
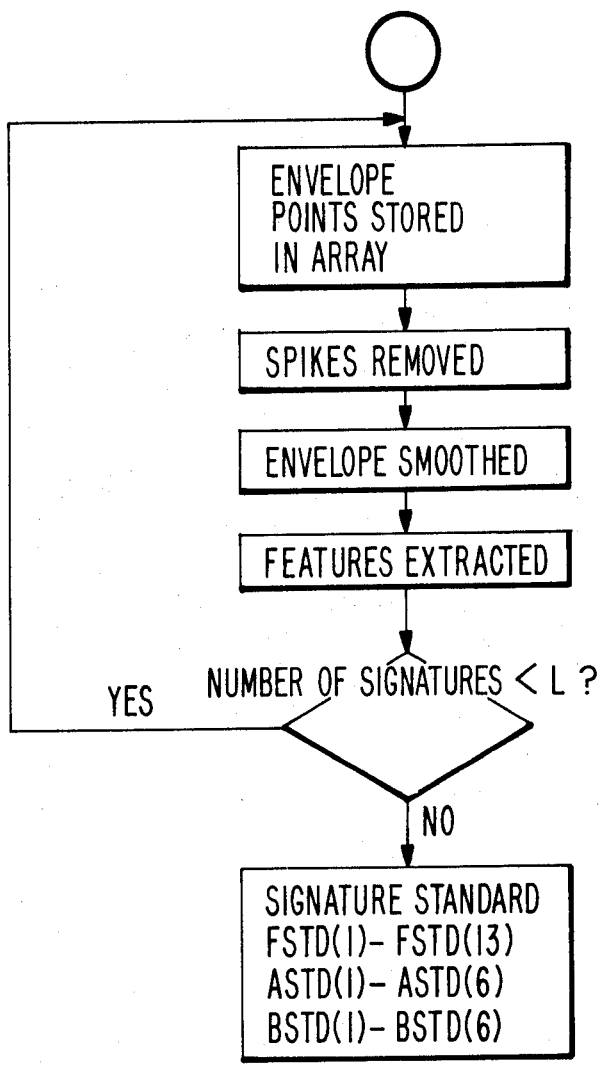
FIG. 9 is a flow chart showing how a signature standard may be generated from a number of signature envelopes of sample signatures.

The detailed discussion above relating to the generation of signals representing envelopes of signatures and the subsequent determination of the authenticity of a sample signature compared with a standard signature is believed to be adequate to enable those skilled in the art to practice the invention. However, to augment the foregoing, flow charts are shown in FIGS. 9 and 10. These charts may be said to summarize the procedures involved in the generation of signals representing the signature standard and the sample signature as well as the procedures involved in the comparison of the sample signature with the signature standard.

In summary, there has been disclosed herein a method and apparatus for determining whether a newly-signed signature and a previously recorded signature were made by the same person. The signature verification technique is based on the envelope of an individual's signature, which consists of selected points of the signature recorded in each of a plurality of scans of a scanning means across the real signature. A plurality of mathematical quantities or characteristics are calculated from the points defining the envelope and compared with corresponding characteristics calculated from the previously recorded signature in order to obtain a decision regarding the verification of the newly-signed signature as authentic or a forgery.

By utilizing the signature verification technique described herein, verification of an individual's signature may be automatically computed with high accuracy without human intervention. Also, the data representations of the characteristics of the standard signature are compressed to a relatively small number of data bits so as to enable their placement on the face of the document to be signed for easy verification of the signature. Further, this technique enables a document to be signed off-line, that is, not in the presence of a merchant or bank teller, as is more often the case in a commercial environment, which thereby eliminates the need for special apparatus and procedures requiring the signing of documents in the presence of such merchants or tellers.

What is claimed is:

1. Apparatus for use in signature verification by comparing features of a signature to be validated against features of a signature standard recorded in binary form, comprising:
    scanning means for scanning a document bearing a signature to be validated, said scanning means providing a first plurality of signals representative of the reflectivity of the signature and the document;
    first means coupled to receive said first plurality of signals and, in response to said signals, generate mode signals, write enable signals, and field indicator signals;
    second means coupled to receive said first plurality of signals and extract a plurality of digital signals representing the electrical values of an envelope formed by a reference line founding the lower part of a signature and a line founding the upper part of the signature where the scanning means scans across the lines of the envelope; and
    a data router coupled responsive to a first set of said mode signals to direct said digital signals for recording in a memory device;
    said data router responding to a second set of said mode signals to direct digital signals recorded in said memory device to a computer for comparison against features of a standard signature recorded therein.

2. The invention as claimed in claim 1, in which:
    the scanning means includes a television camera employing an interlaced scan in which two interlaced scanning fields are provided per picture frame and the first plurality of signals are raw video signals;
    the first means including means for separating blanking pulses from the raw video signals and means for distinguishing valid blanking pulses from spurious high amplitude video signals of short duration.

3. The invention as claimed in claim 1, in which:
    the first means includes a field detector coupled responsive to characteristics of successive valid blanking pulses to distinguish between scanning fields and to generate field indicator signals; and
    the first means includes an envelope complete detector responsive to field indicator signals to generate said mode signals indicating when an envelope is being generated and when an envelope is complete and ready for transmission.

4. The invention as claimed in claim 2, in which:
    the first means includes a field detector responsive to characteristics of successive blanking pulses to distinguish between scanning fields and to generate field indicator signals; and
    the first means includes an envelope complete detector responsive to field indicator signals to generate said mode signals indicating when an envelope is being generated and when an envelope is complete and ready for transmission.

5. The invention as claimed in claims 1, 2, 3 or 4 in which, the computer:
    includes in an internal memory a digital representation of a plurality of distinct features of a signature standard prerecorded therein;
    receives digital signals, from said memory device, representing the envelope;
    processes the digital signals to produce distinct signals representing features of the signature to be validated; and
    evaluates said distinct signals against the digital representation in its memory to effect an evaluation of the signature.

6. Apparatus for generating a plurality of electrical signals for use in determining whether a newly-signed signature and a previously recorded signature were made by the same person, said electrical signals representing selected points forming the envelope of a signature, comprising:
    scanner means for scanning a document bearing a signature to provide a first plurality of signals representative of the reflectivity of the signature and the document;
    comparator means coupled responsive to said first plurality of signals to separate blanking pulses from among said signals and advance the blanking pulses in the system;
    valid blank pulse detector means coupled to receive said blanking pulses and distinguish valid blanking pulses of minimum duration from spurious high amplitude pulses having durations shorter than a minimum period;
    write enable means coupled responsive to valid blanking pulses to receive said pulses;
    field detector means coupled responsive to valid blanking pulses to distinguish a first scanning field of the scanning means from a second field and to provide distinct signals identifying the two fields; and
    an envelope complete detector coupled to receive said distinct signals and generate mode signals indicating by first mode signals that an envelope is being generated and by second mode signals that an envelope is complete and the start of transmission.

7. The invention as claimed in claim 6, including:
    additional means coupled to receive said first plurality of signals and extract a plurality of digital signals representing the electrical values of an envelope formed by a reference line founding the lower part of a signature and a line founding the upper part of the signature where the scanning means scans across the lines of the envelope;
    a data router coupled responsive to first mode signals to direct said digital signals for recording in a memory device; and
    said data router responding to second mode signals to direct said digital signals recorded in said memory device to a computer for comparison against features of a standard signature recorded therein.

8. The invention as claimed in claim 7, in which:

the digital signals are compared in a computer with corresponding signals representing the signature envelope of a previously recorded signature; and the computer generates a signature verification decision based on the degree with which said compared characteristics match.

9. Apparatus for use in signature verification employing a reference signature consisting of a signature envelope generated from a plurality of samples of a signature, said reference signature serving as a signature standard against which a newly recorded signature may be compared, said apparatus comprising:

TV scanner means for scanning a sample signature on a document to produce video signals representative of reflectivity of the scanned documents and the signature;

comparator means coupled to the scanner means for comparing said video signals with a reference potential to transmit blanking pulses;

a valid blanking pulse detector coupled to the comparator to distinguish valid blanking pulses from spurious high amplitude signals at video frequencies which are of short duration;

a field detector coupled responsive to characteristics of successive valid blanking pulses to distinguish between scanning fields and to generate field indicator signals;

an envelope complete detector coupled responsive to said field indicator signals to generate mode signals indicating when an envelope is being generated and when an envelope is complete and ready for transmission;

a gate generator coupled responsive to said valid blanking pulses to provide gate signals;

envelope generator means coupled to said scanner means responsive to said video signals and coupled to said gate generator responsive to said gate signals to provide pulses representing a signature envelope; and means coupled responsive to said mode signals and said pulses representing a signature envelope to route signals representing a complete envelope to a computer for comparison against features of the reference signature stored therein.

* * * * *

UNITED STATES PATENT AND TRADEMARK OFFICE
CERTIFICATE OF CORRECTION

PATENT NO. : 4,286,255
DATED : August 25, 1981
INVENTOR(S) : Pepe Siy

It is certified that error appears in the above—identified patent and that said Letters Patent is hereby corrected as shown below:

Col. 5, Line 36, patent reads "To $\wedge$ T1" should be "To $\wedge$ $\overline{T1}$"

Col. 5, Line 37, patent reads "To $\wedge$ T1" should be "To $\wedge$ $\overline{T1}$"

Col. 5, Line 38, patent reads "To $\wedge$ T1 $\wedge$ T2" should be "To $\wedge$ $\overline{T1}$ $\wedge$ $\overline{T2}$"

Col. 10, Line 35-40 patent reads "$\sum_{K-1}^{6}$" should be "$\sum_{K=1}^{6}$"

Signed and Sealed this

Third Day of November 1981

[SEAL]

Attest:

GERALD J. MOSSINGHOFF

*Attesting Officer*  *Commissioner of Patents and Trademarks*